United States Patent

Yonemaru et al.

[11] Patent Number: 6,117,472
[45] Date of Patent: Sep. 12, 2000

[54] PROCESS FOR PREPARING DOUGH PIECES

[75] Inventors: Masahiro Yonemaru; Mikio Kobayashi; Takamasa Tsuchida, all of Utsunomiya, Japan

[73] Assignee: Rheon Automatic Machinery Co., Inc., Japan

[21] Appl. No.: 09/199,991

[22] Filed: Nov. 24, 1998

[30] Foreign Application Priority Data

Nov. 25, 1997 [JP] Japan ................................... 9-322803

[51] Int. Cl.⁷ ....................................................... A21D 6/00
[52] U.S. Cl. ........................ 426/496; 426/502; 426/503; 426/517
[58] Field of Search ................... 426/502, 503, 426/504, 496, 517; 425/363

[56] References Cited

U.S. PATENT DOCUMENTS

| | | |
|---|---|---|
| 3,553,775 | 1/1971 | Decker . |
| 4,056,346 | 11/1977 | Hayashi .................................. 425/373 |
| 4,276,317 | 6/1981 | Hayashi .................................. 426/517 |
| 4,338,341 | 7/1982 | Glass ..................................... 426/503 |
| 4,375,349 | 3/1983 | Vrbanek ................................. 425/337 |
| 4,869,661 | 9/1989 | Nogueroles ............................ 425/230 |
| 4,904,491 | 2/1990 | Morikawa et al. ..................... 426/503 |
| 4,946,699 | 8/1990 | Kageyama et al. .................... 426/502 |
| 5,091,202 | 2/1992 | Hayashi ................................. 426/496 |
| 5,110,277 | 5/1992 | Hayashi ................................. 425/363 |
| 5,124,163 | 6/1992 | Hayashi ................................. 426/517 |
| 5,204,123 | 4/1993 | Hayashi ................................. 425/147 |
| 5,225,209 | 7/1993 | Hayashi ................................. 425/363 |
| 5,232,713 | 8/1993 | Morikawa et al. ..................... 425/140 |
| 5,266,341 | 11/1993 | Morikawa et al. ..................... 426/503 |
| 5,310,569 | 5/1994 | Muller ................................... 426/517 |
| 5,498,148 | 3/1996 | Ouellette et al. ....................... 426/503 |
| 5,505,970 | 4/1996 | Morikawa .............................. 426/231 |
| 5,733,589 | 3/1998 | Oki ........................................ 425/367 |
| 5,888,573 | 3/1999 | Hayashi ................................. 426/502 |

FOREIGN PATENT DOCUMENTS

| | | |
|---|---|---|
| 687310 | 5/1996 | Australia . |
| 0 140 458 | 10/1984 | European Pat. Off. . |
| 0 251 138 | 6/1987 | European Pat. Off. . |
| 0 311 240 | 8/1988 | European Pat. Off. . |
| 0 326 404 | 1/1989 | European Pat. Off. . |
| 0 329 398 A1 | 2/1989 | European Pat. Off. . |
| 0 453 248 | 4/1991 | European Pat. Off. . |
| 0 545 725 | 12/1992 | European Pat. Off. . |
| 0 657 101 | 12/1994 | European Pat. Off. . |
| 744 126 A1 | 11/1996 | European Pat. Off. . |
| 0 783 837 A1 | 1/1997 | European Pat. Off. . |
| 44 24 461 | 7/1994 | Germany . |
| 60-184345 | 9/1985 | Japan . |
| 61-6782 | 2/1986 | Japan . |
| 5-3253 | 11/1993 | Japan . |
| 6-37 | 1/1994 | Japan . |
| 2021723 | 10/1994 | Russian Federation . |

OTHER PUBLICATIONS

Abstract of RU 20 201 723 in English language, 2 pages.

Primary Examiner—George C. Yeung
Attorney, Agent, or Firm—Brinks Hofer Gilson & Lione

[57] ABSTRACT

A process for preparing dough pieces is provided. In the process, fermented dough receives repeated pressure for stretching, which pressure is given by a pressing device. However, through this process, the network structure of gel is not broken. Thus, a further fermentation step, such as an intermediate fermentation step or a final fermentation step, can be eliminated.

6 Claims, 2 Drawing Sheets

PROCESS FOR PREPARING DOUGH PIECES

FIELD OF INVENTION

The present invention relates to a process for preparing bread. According to this process, the final proofing step, which has been always performed after the final molding of dough and before baking, can be eliminated. Thus, a simpler process as compared to conventional processes for preparing bread can be provided. Further, high-quality breads for meals can be provided.

PRIOR ART

Conventional processes for preparing bread comprise the steps of kneading materials for bread dough, by using a mixer (or a kneading apparatus), fermenting the dough, dividing the fermented dough, molding the divided dough, intermediately proofing the molded dough (bench time), molding the proofed dough, finally proofing the molded dough to give distended dough, and baking the distended dough. One of the main objects of setting up the bench time and performing the final proofing is that the broken network structure of gel, which results from dividing dough of one batch by a mechanical force, or from a mechanical molding of bread dough, is repaired, that the dough is sufficiently fermented to thereby distend, and that, after baking, bread having a sufficient volume is obtained. That is, although, during the preparation of bread dough by kneading materials for the dough, a network structure of gel of wheat gluten protein is formed in the dough to give an elastic body which will distend by baking, the elastic constitution of the dough breaks because of the mechanical force which is applied at the step of dividing the dough of one batch to give dough pieces. Therefore, to repair the broken constitution, the dough must have the bench time under an environment where the dough can ferment. Also, in the molding step, the network structure of gel is broken by the mechanical force. Therefore, to repair the broken network structure, another fermentation step (the final proofing) has been provided in the conventional processes. Alternatively, a dough improver such as potassium bromate must be previously added to the dough.

The object of the present invention is to provide a simple process for preparing bread in which the intermediate proofing step or the final proofing step or both can be eliminated and no dough improver is needed.

According to the process of the present invention, the network structure of gel in bread dough is not injured. Specifically, in the process of the present invention, a fermented bread dough passes through a space within a pressing apparatus while being pressed and being gradually conveyed downstream. Thus, it can be stretched and molded to give a belt-like form without the network structure being injured. As examples of the inventions in which it is tried to stretch fermented bread dough without injuring the network structure, those disclosed in U.S. Pat. Nos. 4,946,699 and 5,091,202, and European Patent Publication No. 0744126-A1, can be cited. That is, U.S. Pat. No. 4,946,699 discloses a method for producing bread from preserved dough in which the dough is stretched while being subjected to vibrations. U.S. Pat. No. 5,091,202 discloses a method for producing a continuous belt-like sheet of bread dough in which the dough in a hopper is downwardly conveyed by vertical conveyers which face oppositely. Further, European Patent Publication No. 0744126-A1 discloses a method of feeding dough in which at least one horizontally opposed pair of rotatable feeding means that are positioned below the hopper and between which the dough passes move so that the distance between the pair or pairs of means increases and decreases, repeatedly. However, none of them discloses a process for preparing bread of the present invention in which a pressing means is used for repeatedly pressing fermented dough to stretch the dough, and the stretched dough is cut to give dough pieces, which dough pieces can be baked without the intermediate or final fermentation step or both of the dough.

SUMMARY OF INVENTION

While in the conventional bread preparation processes the intermediate proofing step or the final proofing step or both are needed as discussed above, in the present invention those steps can be eliminated. Thus, the processing time from the start of the dough preparation to the baking of the dough can be very greatly shortened. Further, according to the present invention, excellent bread can be obtained. Specifically, since the intermediate proofing step or the final proofing step or both are eliminated (i.e., there are only one or two fermentation steps), not only breads having a favorable taste can be baked, but also the processing time and costs can be largely reduced.

Thus, the present invention is to provide a process for preparing bread comprising the steps of:

(1) providing a pressing means comprising a pressing element and an element that is opposed to and spaced apart from said pressing element, (2) feeding fermented dough into a space between said pressing element and said element, (3) repeatedly pressing said fermented dough by alternately and repeatedly decreasing and increasing the distance between said pressing element and said element to give a belt-form dough, and (4) cutting said belt-form dough to give pieces having a predetermined size, which pieces can be baked without a proofing step.

Preferably, said element that is opposed to and spaced apart from said pressing element is also a pressing element.

Said fermented dough is desirably pressed by swinging the pressing elements.

Said pressing elements are preferably one pair of roller groups, each of which includes a plurality of rollers that are vertically arranged, each roller being capable of rotating so that said belt-form dough is sent downward.

Said pressing means is generally arranged below a hopper, said pair of roller groups being arranged in a V-like shape when the lowermost rollers are closest to each other.

The circumferential speed of each roller is desirably changeable.

DETAILED DESCRIPTION OF INVENTION

For performing the process for preparing bread of the present invention, first, a kneaded dough is made by kneading materials for bread dough having a conventional formulation in any known kneading apparatus. Next, this dough is left to stand in storage in an environment in which a suitable temperature is retained. Thus, the dough is fermented and is made to contain sufficient gases therein. This fermented dough receives periodic pressure by a means for applying the pressure (i.e., by the pressing means). By repeatedly receiving the pressure the dough can be molded into a thin layer form (or a belt-like shape) having an elasticity, since the means for applying pressure hinders any increase in the stress inside the dough and does not break the network structure of gel. The dough is cut to be a predetermined size and form, or further molded. The dough pieces thus obtained can be immediately baked. As used herein, "fully fermented" refers to dough in this condition.

In the present invention, the fermented dough that is obtained by kneading materials for bread dough and then fermenting the dough in an environment in which a suitable temperature is retained receives periodic pressure by a means for applying the pressure. The means repeatedly decreases and increases the thickness of the dough being processed by applying and releasing the pressure to and from the dough. That is, the dough repeatedly receives pressure by the pressing means. The dough is gradually and continuously discharged from a pressing apparatus and takes a thin layer form such as a belt-like shape. This dough having a thin layer form is cut to give dough pieces having a predetermined form. These dough pieces retain sufficient gases therein. Therefore, they can be immediately baked without being fermented again, to give high-quality bread.

According to the process for preparing bread of the present invention, the final fermentation step, which has always been performed after the final molding of dough and before baking, can be eliminated. Further, the intermediate fermentation step may also be eliminated. Thus, the process can be shortened as compared to conventional processes for preparing bread. Further, in the present invention, the necessity of a chemical improver can be reduced.

PREFERRED EMBODIMENTS

Based on FIGS. 1 and 2, a preferred embodiment of the present invention will be explained below.

Figure 1:
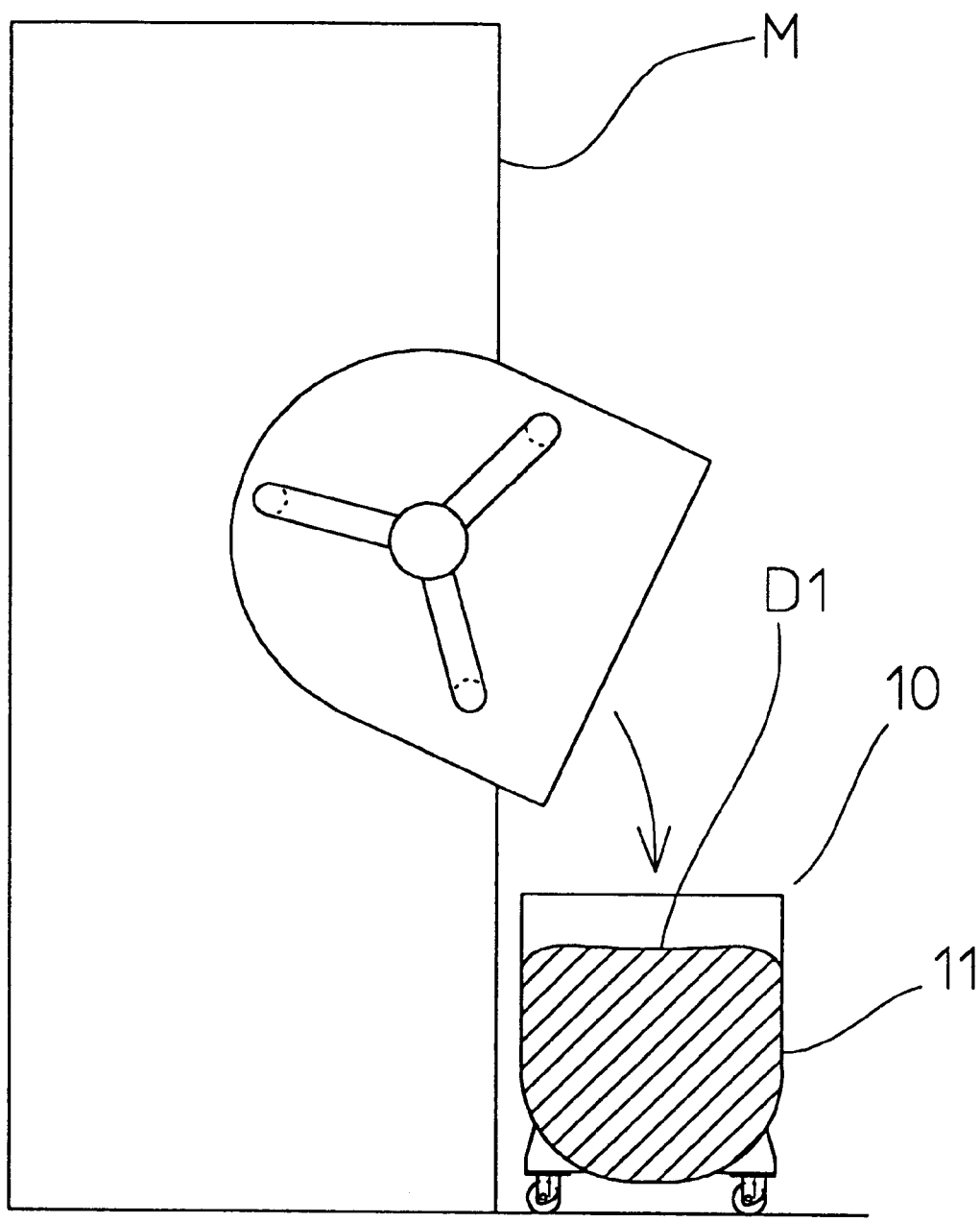
FIG. 1 is a vertical longitudinal sectional view of a kneading apparatus.

FIG. 1 shows a conventional kneading apparatus M. It also shows a dough box 11 as a storage container 10 in which kneaded dough D1, which is prepared by the apparatus M, is stored and left to stand. FIG. 2 is a side view of a device which is useful to explain the preferred embodiment of the present invention.

For fermentation, the dough box 11, which contains the dough D1, is placed in a heat-retaining room in which the temperature is set to be within a predetermined temperature range that is suitable for fermentation. Alternatively, the dough box 11 may be placed on a floor, when the entire bread-preparation-line is placed in a room in which a suitable temperature is set. When the temperature in the room in which the entire bread-preparation-line is placed is suitable for fermentation, the time for the dough to stand at rest and to be left in the dough box 11 may be shortened, since the room acts as heat-retaining storage. In this case, the dough may be fermented while being repeatedly pressed in the next step, which will be explained below. That is, the dough to be processed may not necessarily be fully fermented. Also, when the temperature of the apparatus which is to be used in the next step is controlled within a temperature range that is suitable for fermentation, the dough may not necessarily be fully fermented.

In an embodiment, fermented dough D2 is put into a hopper 19. There is a pressing apparatus 20, which acts as a pressing means, located below the lower opening of the hopper 19. The pressing apparatus 20 comprises one pair of roller groups 20L and 20R. They are oppositely arranged in a V-like shape when the lowermost rollers are closest to each other. The roller groups 20L and 20R include four rollers 22L and four rollers 22R, respectively. The roller groups 20L and 20R apply pressure to the fermented dough D2 by repeatedly pressing it. Simultaneously, by rotating the rollers 22L and 22R (wherein the rollers 22L in the roller group 20L and the rollers 22R in the roller group 20R rotate in opposite directions, as shown by arrows b), the fermented dough D2 is sent downward while being molded to be a belt-like shape.

The roller group 20L comprises a roller-supporting member 21L and a plurality of pressing rollers 22L, which are vertically arranged. The roller supporting member 21L comprises a swing arm 24L, to which the pressing rollers 22L are attached. Similarly, the roller group 20R comprises a roller supporting member 21R and a plurality of pressing rollers 22R, which are vertically arranged. The roller supporting member 21R comprises a swing arm 24R, to which the pressing rollers 22R are attached. The plurality of pressing rollers 22L and 22R rotate in the direction in which the dough D2 is urged downwardly, which direction is shown by arrows b. The rollers 22L and 22R are rotated by the motors 23L and 23R, respectively. The pairs of rollers 22L, 22R are opposed to and synchronized with each other. The circumferential speeds of the plurality of pressing rollers can be suitably selected considering the conditions of the fermented dough D2 that is supplied. For example, the uppermost roller has the slowest speed, the second roller has a speed faster than that of the uppermost roller, the third roller has a speed faster than that of the second roller, and the lowermost roller has the fastest speed. Instead, in some cases the uppermost roller has the fastest speed. The circumferential speed of each roller is preferably changeable.

To facilitate the discharge of the belt-form dough D3 from the space between the roller groups 20L and 20R at their lowest portions (i.e., at the portion from which the dough D3 is discharged), the roller-supporting member 21R in the roller group 20R is constituted so that the supporting member 21R can swing to and from the roller-supporting member 21L in the roller group 20L, in which the fulcrum for swinging is the upper end of the swing arm 24R. To swing the roller-supporting member 21R, it is linked through a coupling link 27 to a circular driving link 26, which is driven by a motor 25 for swinging. The motor 25 is placed on a suitable part of a frame 2 of the pressing apparatus 20. Similarly, the roller-supporting member 21L in the roller group 20L is constituted so that the supporting member 21L can swing to and from the roller-supporting member 2 IR in the roller group 20R, in which the fulcrum for swinging is the upper end of the swing arm 24L. To control the swinging of the roller-supporting member 21L, it is linked through a coupling link 30 to a circular driving link 28, which link 28 is rotated by a motor 29, which controls the distance between the roller groups 20L and 20R at their lowest portions. The motor 29 is also placed on a suitable part of a frame 2 of the pressing apparatus 20. An example of the motors 25, 29 is a servomotor.

Below the pair of the roller groups 20L and 20R there is a conveyer 31 for conveying the dough D3 which has been discharged from the pressing apparatus 20 and which has a belt-like shape. A pair of gauge rollers 32,32 are downstream of and adjacent to the conveyer 31. A conveyer 33 is downstream of the gauge rollers 32,32. A cutter 34 is above the conveyer 33. The cutter 34 cuts the belt-like dough D3 to give dough pieces D4 having a predetermined size.

The pressing means does not always comprise a pair of the roller groups 20L and 20R. For example, one element of the pressing means can be made of a plate and the other element can be constituted by a roller group. Both elements can move and can cause the distance between them to change. Alternatively, only the one element that is constituted by a roller group can be made to move, and it alone can cause the distance between the elements to change. Further, one element of the pressing means may be a conveyer belt.

The pair of the roller groups 20L and 20R do not necessarily form a V-like shape when the lowermost rollers are closest to each other. They may be arranged in parallel. They do not necessarily swing. They may press the dough D2 in a parallel arrangement.

Figure 2:
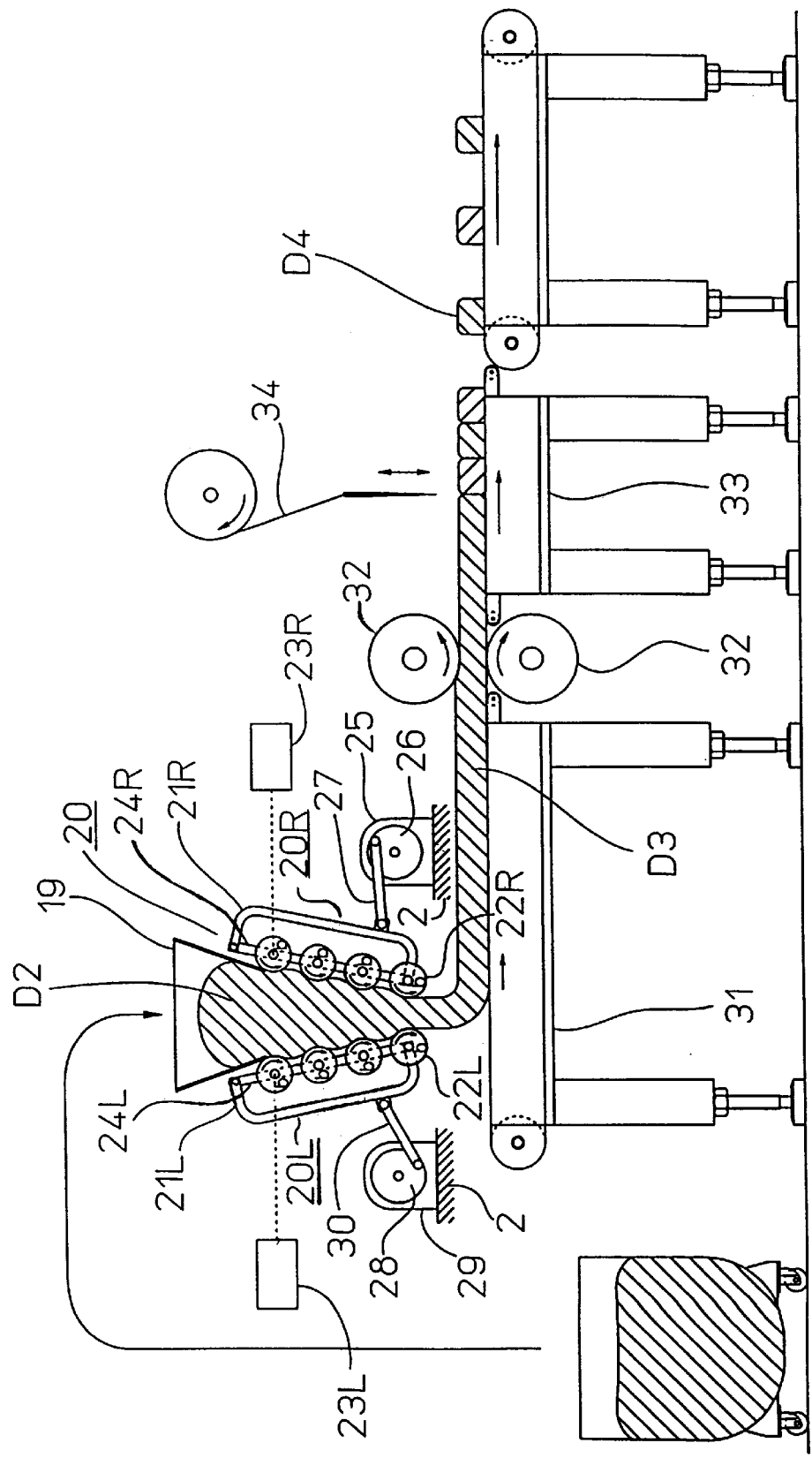
FIG. 2 is a side view of a device which is used to practice an embodiment of the present invention.

Although in FIG. 2 the pressing rollers 22L, 22R have a circular cross section, the cross section form is not limited to a circular form. For example, their cross-sectional form may be polygonal, or polygonal with rounded corners, or with concave or convex portions. The cross-sectional form of the rollers may be selected according to the properties of the fermented dough D2.

The fermented dough D2 is not always discharged in a vertical direction from a hopper or a pressing means. For example, the dough D2 can be discharged from the lower end of the hopper and brought in an oblique direction. When the dough D2 runs in an oblique direction, it is repeatedly pressed by the pressing means, which is arranged above and under the dough D2, while the dough D2 or processed dough D3 is sent downstream. Alternatively, the fermented dough D2 may be horizontally stretched by being repeatedly pressed by the pressing means, which is arranged above and under the dough D2. In these cases, the element which is arranged under the dough D2 may be a conveyer belt.

If surfaces which were formed by cutting the dough D3 with the cutter 34 are treated to be sealed, dough pieces D4 will expand more than otherwise, since the gas within them is hindered from escaping. To prevent the exposure of surfaces that were made by cutting the dough D3, with the cutter 34 a member having an obtuse angle may be used. The members are arranged on both sides of the cutter 34 and crush both ends of the dough pieces D4.

Next, a specific example of the condition of the process of the present invention will be shown.

A kneaded dough D1 was left to stand for 90 minutes (a floor time) in a room kept at a temperature of 28° C. to give fermented dough D2. The dough D2 was fed into a hopper 19. The dough D2 was repeatedly pressed by a pressing apparatus 20. From the space between the lowest two rollers of the pressing rollers 22L and 22R, a processed dough D3 was discharged while being molded to have a thickness of 25 mm. By passing the dough D3 through the gap between gauge rollers 32, 32, the increase of the thickness of the dough D3 by its elasticity was controlled so that the dough D3 was molded to have a belt-like shape and a thickness of about 25 mm. This dough D3 was cut to give rectanglar dough pieces D4 having a size of 200 mm×70 mm×25 mm. These dough pieces D4 were placed on a plate and baked in an oven at about 200° C. for 35 minutes. Thus, French bread (baguette) having a satisfactory volume was obtained.

Likewise, various types of French bread other than baguette, rye bread, and chapati (capati), having high qualities, and the like, can be obtained.

What is claimed is:

1. A process for preparing dough pieces comprising the steps of:
    (1) providing a pressing means comprising a first pressing element and a second element that is opposed to and spaced apart from said first pressing element,
    (2) feeding fully fermented dough into a space between said first pressing element and said second element,
    (3) repeatedly pressing said fully fermented dough by alternately and repeatedly decreasing and increasing the distance between said first pressing element and said second element to give a belt-form dough, and
    (4) cutting said belt-form dough to give dough pieces having a predetermined size, which dough pieces can be baked without a proofing step.

2. The process of claim 1, in which said second element is also a pressing element.

3. The process of claim 2, in which said fully fermented dough is pressed by swinging the first and second pressing elements.

4. The process of claim 2, in which said first and second pressing elements are one pair of roller groups, each of which includes a plurality of rollers that are vertically arranged, in which each roller rotates so that said belt-form dough is sent downward.

5. The process of claim 4, in which said pressing means is arranged below a hopper, and in which said pair of roller groups is arranged in a V-like shape when the lowermost rollers are closest to each other.

6. The process of claim 4, in which a circumferential speed of each roller can be changed.

* * * * *